Patented Nov. 11, 1952

2,617,745

UNITED STATES PATENT OFFICE 2,617,745

METHOD OF PRODUCING AN ELECTROCONDUCTIVE ARTICLE

Richard F. Raymond, Saxonburg, and Brook J. Dennison, Tarentum, Pa., assignors to Pittsburgh Plate Glass Company No Drawing. Application December 19, 1951, Serial No. 262,479

9 Claims. (Cl. 117—69)

This invention relates to the production of transparent films or coatings upon lime soda glass, and to novel glass products having electroconductive coatings. In United States Letters Patent No. 2,118,795, granted to J. T. Littleton, a process is described wherein an electroconductive coating is deposited upon a glass insulator by heating the insulator to a temperature of 600 to 750° C. and subjecting the hot insulator to the action of stannic chloride. The films thus deposited are stated to be iridescent and transparent to solar heat, and are said to improve the properties of insulators.

Since such films possess some transparency, attempts have been made to apply them to transparent plate or window glass sheets to be used as viewing closures, and to make use of the conductive films as heating elements in an electrical circuit in order to heat the glass and thus to prevent or minimize formation of fog, snow, or ice thereupon. However, serious problems arise from such attempts. If the films are deposited according to the process of the above patent at a temperature of 1150° F. or below, in a thickness sufficient to give the film a relatively high electroconductivity so that a relatively low voltage, for example, 6 to 220 volts, may be applied effectively thereto, the films frequently have poor transparency and may even be opaque. On the other hand, films which are sufficiently thin to have good transparency often have electrical resistance well above 1000 to 2000 ohms per unit square. While some improvement is possible at higher temperatures, treatment of soda lime glass, except in thick sections, becomes impractical due to the tendency of the glass to soften objectionably. The expression of electrical resistance in terms of ohms per unit square is a convenient method of expressing the resistance of thin films and, in reality, is the specific resistivity of the film divided by the average film thickness within the area of a square.

Further research has led to the discovery that by use of proper precautions and special solutions, transparent films can be provided on soda lime glass which have unusually low electrical resistance. Thus, it has been found that the use of certain agents, such as methanol or phenyl hydrazine hydrochloride, in conjunction with stannic chloride, produces a transparent coating which has a resistance in terms of ohms per unit square below 500, and generally below 150. Such low electrical resistance has made possible the provision of viewing closures in the cabins of automotive vehicles, such as aircraft and automobiles, which have a transparent surface, which closures may be electrically heated in a convenient manner. The provision of such an article affords a convenient means of preventing accumulation of fog, ice, or snow upon the viewing closure simply by electrically heating the glass, using the transparent films as the resistance element.

Despite the fact that the above process permits production on a large scale of viewing closures having conductive films with electrical resistance below 500 ohms per unit square, a portion of products thus produced have been defective due to the presence of haze in the film. This haze sometimes developed in localized areas of the glass sheet and, at other times, the entire surface of certain articles was found to be hazy. In consequence, an undue number of glass panels have been rejected as unsuitable for use as viewing closures. Especially is this true when organic agents, such as alcohol, are used as above described. Losses due to these "rejects" have very materially increased the cost of production of suitable viewing closures.

According to the present invention, it has been found that haze and similar defects may be eliminated or substantially reduced by depositing an intermediate film of silica or other material, which is either free of alkali metal or which has a low available $Na_2O$ content, upon a soda lime glass base and depositing the transparent electro-conductive tin oxide or equivalent metal oxide coating upon the film. The surface $Na_2O$ content of the soda lime glass coated with the intermediate film should be lower after heating for 4 minutes at 1150° F. than the $Na_2O$ content of ordinary soda lime glass when so heated.

The reduction in haze which accrues by virtue of this process is effected by restricting the amount of alkali metal which is permitted to come into contact with the electroconductive film during formation. It will be understood that ordinary soda lime glass contains a certain minimum of alkali metal as $Na_2O$ and $K_2O$. When such glass is heated, for example, above 400 F. for one or more minutes, further amounts of alkali metal migrate to the surface, and the surface concentration thereof becomes quite high. Hence, as stannic chloride or similar compound is applied to the base, alkali metal salt is formed and becomes entrapped in the coating being formed, thus causing haze.

The intermediate surface film or layer restrains migration of the alkali metal. Consequently, haze formation will be minimized if the intermediate film contains less available surface alkali metal (K₂O and Na₂O, for example) than does the glass surface after heating to the temperature at which the electroconductive film is applied.

In the usual practice of the invention, the glass is cleaned and coated with a thin transparent layer of silica or similar refractory coating. This film is quite thin, usually having a thickness below 100 millimicrons, and rarely being above 300 millimicrons. Where glass sheets are treated, it is advantageous to provide both sides of the glass sheet with the film in order to avoid warping which may tend to occur during deposition of the electroconductive coating.

Following this coating operation, the glass is heated above 400° F., preferably 800 to 1250° F., and the heated sheet is sprayed or otherwise contacted with an hydrolyzable metal compound, such as stannic chloride, which is capable of producing a transparent electroconductive coating upon the coated surface of the glass. Care should be exerted to avoid an excessively long heating period since alkali metal in the interior of the glass tends to migrate to the surface through the silica film or coating to an objectionable degree, thus causing haze formation. Consequently, heating should be discontinued and the electroconductive film should be applied before such migration can occur to a degree such as to raise the alkali metal atom concentration at the surface of the silica coating to that of the surface of untreated soda lime glass when heated to the same temperature.

This invention is particularly applicable to use with the treatment of window glass or plate glass, i. e., soda lime glass, since haze which develops appears to be due, at least partially, to the presence of alkali, and does not appear to be serious with other forms of glass. Furthermore, it is of particular importance when metal halides, such as stannic chloride, are used to form or deposit the transparent electroconductive film.

Particularly advantageous films which may be applied are silica films. Such films may be applied by any convenient method which is capable of producing a thin uniform film which is essentially free from defects, and preferably is free or essentially free from color. One effective method involves dipping the glass to be treated into an anhydrous or substantially anhydrous solution of a silicon halide, such as silicon tetrachloride, removing the glass from the solution, and allowing it to dry. Such dipping normally results in the development of a considerable amount of powder, which probably is silica, upon the glass surface. When this powder is wiped off and the plate rubbed or polished with a soft dry cloth until it is clear and bright, the glass is ready for application of the electroconductive tin oxide coating.

Various solutions of silicon tetrachloride may be used. A particularly effective solution comprises silicon tetrachloride and carbon tetrachloride as a solvent, solutions containing 0.5 to 5 per cent by volume of SiCl₄, based upon the volume of carbon tetrachloride, being most suitable. The solution also may contain a soluble ketone, such as acetone or methyl ethy ketone, in amount from 0.5 to 10 per cent by volume, based upon the carbon tetrachloride. This film is especially good as an intermediate layer between the base and the electroconductive coating, being superior to most others in this respect.

It has been found advantageous to conduct the drying of the dipped glass in an atmosphere which has a relative humidity not less than about 30 per cent, and preferably at least about 38 per cent, at room temperature (75° F.). Lower humidities tend to produce opaque deposits upon certain portions of the glass which are difficult to remove.

The intermediate films which are provided according to this invention are quite thin, being so thin as to be substantially invisible. Usually, they will have a thickness less than 100 millimicrons. Repeated dipping, drying, cleaning, and redipping, or other repeated coating operation will build up thicker layers. However, it is rare that a film thicker than about 300 millimicrons is deposited.

The exact composition of the films provided according to any of these processes is not known with certainty, and is exceedingly difficult to determine because of the unusual thinness of the film. When silicon tetrachloride-carbon tetrachloride mixtures are used as described above, the film is composed preponderantly of silicon together with some oxygen, and largely comprises silica, as such, or combined as a silicate. The term "silica" is intended to include transparent films containing silicon and oxygen whether or not the exact composition thereof corresponds to the formula ($SiO_2$) for silica.

The above described method of applying the silica film by dipping, using a carbon tetrachloride solution of silicon tetrachloride, has been found to produce good films which effectively minimize haze which otherwise is formed upon application of the electroconductive tin oxide directly to soda lime glass. However, other methods may be used to deposit the silica film. Thus, other silicon halides, such as silicon tetrabromide or silicochloroform, may be used in lieu of silicon tetrachloride in the above process. Moreover, other non-polar solvents, including liquid hydrocarbons or hydrocarbon halides, such as ethylene dichloride, perchloroethylene, benzene, xylene, toluene, chloroform, etc., may be used in lieu of carbon tetrachloride.

Furthermore, different methods of application may be resorted to. Thus, silica films may be deposited by dipping the glass into an aqueous solution of a partially hydrolyzed silicic acid ester, such as tetraethyl orthosilicate, tetramethyl orthosilicate, or tetra n-propyl orthosilicate.

After the silica or other film has been applied, the white powder if formed is removed, and the glass cleaned if necessary to the point where it is clear and bright, the glass is ready for application of the electroconductive transparent tin oxide film. The treated glass is heated to a temperature above about 400° F., usually 800 to 1250° F., but below the temperature at which glass melts, and the heated glass is sprayed with the metal compound, such as stannic chloride (usually in atmospheric air which possesses some amount of moisture characteristic of atmospheric air). The period of heating should be limited since, if heating is continued for an excessive period, migration of alkali metal atoms from the interior of the glass through the silica film tends to occur, thereby nullifying the effect of the silica film. Usually, a heating period of 1 to 10 minutes is sufficient for the purpose. Longer times are permissible so long as the amount of alkali metal diffusion does not become excessive, but rarely is heating continued over one hour.

When the glass has been heated to the above temperature, it is withdrawn from the heating zone and is immediately sprayed or otherwise contacted in air with the electroconductive film-forming compound either as a vapor or solution. When a solution is used, a quantity of the coating solution is placed in an atomizing spray gun and the hot glass is sprayed with an atomized spray of the solution for a few seconds, usually of the order of 1 to 20 seconds. Usually, this coating operation is conducted in the presence of an oxygen source, such as water, air, or oxygen. Conductive coatings have been obtained when air did not appear to be present although it is probable that oxygen available either as elemental oxygen or combined in water or similar compound is essential to this operation.

When a tin compound, such as stannic chloride, stannous chloride, stannous acetate, stannous phosphate, stannic phosphate, stannous oxalate or equivalent hydrolyzable tin compound, is used as the coating material, the process produces a transparent electroconductive film which largely comprises an oxide of tin. Such films are at least 95 to 99 per cent tin oxide, and contain certain impurities, such as chlorine, carbon, and silicon, and may contain some amount of elemental tin.

In depositing films upon soda lime glass, it has been found that certain agents, notably methanol and phenyl hydrazine hydrochloride or antimony trichloride, materially improve the coating, particularly as to its electroconductivity. A wide variety of other agents of this character, such as those described in an application of W. O. Lytle for United States Letters Patent, Serial No. 762,658, filed July 22, 1947, may be used.

The amount of addition agent which is used is capable of substantial variation, depending upon the results desired. Small amounts (even traces) show an improvement in the conductivity and freedom from haze of the film, and such improvement increases to a maximum as the amount of addition agent is increased. In general, the amount of such agent which is used in conjunction with the tin compound is at least 0.01 to 0.1 mol per mol of tin compound. As an example, with agents such as methanol, it has been found that a solution comprising 1000 parts by weight of $SnCl_4 \cdot 5H_2O$ and 1 part by weight of methanol produced a film having a specific resistivity of about 0.012 ohm centimeter, whereas a solution containing equal parts by weight of stannic chloride pentahydrate and methanol produced a film having a specific resistivity below 0.002. Since larger amounts of such agents do not produce markedly greater improvement of the film, it is quite rare to use more than 50 parts by weight of addition agent per part by weight of tin compound.

Quite frequently, mixtures of agents have been found to be preferable. For example, alcohols, such as methanol, are found to function better when used with hydrazines, such as phenyl hydrazine or phenyl hydrazine hydrochloride or the other hydrazines or their hydrochlorides. In such a case, at least 0.01 mol of the hydrazine, such as phenyl hydrazine, and 0.01 mol of the alcohol, such as methanol, per mol of tin compound, such as stannic chloride, normally are used.

The invention has been described with special reference to the use of stannic chloride as the tin compound for production of the electroconductive film. This compound is particularly valuable since it may be used either in aqueous medium or in vapor state to produce films which visibly appear to be flawless. Film-forming tin compounds, (particularly compounds which are decomposable or hydrolyzable to produce a tin oxide electroconductive coating), such as stannic bromide, $SnBr_3Cl$, $SnBrCl_3$, $SnCl_2I_2$, $SnI_4$, stannic sulphate, stannic phosphate, stannic nitrate; or stannous salts, such as stannous acetate, stannous oxalate, stannous chloride, stannous nitrate, stannous tartrate or stannous phosphate and like tin salt, may be used. Organic tin compounds also may be used. Such compounds may include those having the structure $R_mSnX_n$, where R is a monovalent aryl, aliphatic, or arylaliphatic radical linked to the tin atom through carbon, and X is another monovalent aryl, aliphatic, or arylaliphatic radical linked to the tin atom through carbon, or is a radical such as hydride, hydroxyl, chloride, bromide, iodide, acetate, etc., and the sum of $m$ and $n$ is 4, such as tetra ethyl tin, tetra methyl tin, tetra n-heptyl tin, tetra amyl tin, tetra benzyl tin, tetra phenyl tin, tetra p-tolyl tin, tetra p-xylyl tin, tribenzyl ethyl tin, tribenzyl tin chloride, tributyl tin chloride, triethyl n-amyl tin, tolyl tin trichloride, ethyl tin tribromide, ethyl stannic acid, ethyl chlorostannic acid, diethyl tin oxide. Moreover, other tin compounds, such as diphenyl tin, diethyl tin, stannic bis-acetylacetone dichloride or dibromide, etc., may be used.

In general, it is desired to use tin compounds which are liquid or which may be vaporized readily or which may be dissolved in solvents such as water, or organic solvents, such as benzene, xylene, toluene, acetone, methanol, ethanol, methyl ethyl ketone, etc., in order that the tin compound may be applied to the base as a homogeneous liquid or solution. Such solutions normally contain at least 10 to 50 parts by weight of tin compound per 100 parts by weight of solution.

According to a further embodiment, mixed oxides may be applied. For example, an aqueous solution containing the usual amount of stannic chloride or other tin compound may have dissolved therein, or mixed therewith, compounds of other metals, such as indium chloride, cadmium bromide, cadmium acetate, zinc bromide, zinc acetate, chromium chloride, ferric chloride, or other compound of these metals, to modify the properties of the film. As a typical embodiment, 10 to 500 per cent by weight of cadmium chloride or acetate, based upon the weight of stannic chloride in the solution, may be added to the solutions of Examples I, II, III, or IV, adding sufficient water if necessary to dissolve the mixture, and these solutions may be used in lieu of the solutions described in such examples.

Not infrequently, it is desirable to apply the transparent coating to the treated glass base by recourse to a vaporized tin compound, such as stannic chloride vapor. In such a case, the vapor of the tin compound may be mixed with the vapor of the addition agent (methanol, etc.) and the vapor mixture sprayed upon the glass base.

During the coating operation, whether by use of anhydrous vapor or aqueous solution of the tin compound, the hot glass normally is supported by convenient means in atmospheric air which normally contains some moisture (relative humidity usually above 30 per cent). Consequently, the spraying operation is conducted in the presence of water, even if no water is present in the spray itself.

Since the haze which is avoided by recourse to this invention is created largely by sodium, the invention is applicable to provision of electroconductive coatings upon various types of glass having a high content of sodium. These glass have the general composition:

Per cent by weight

| | |
|---|---|
| Alkali metal oxide, such as $Na_2O$ and/or $K_2O$ | 10 to 35 |
| Alkaline earth metal oxide, such as CaO and/or MgO | 5 to 25—the CaO content being not less than 5 per cent by weight |
| $SiO_2$ | 50 to 75 |
| $Al_2O_3$ | 0 to 20 |

It will be understood that various other materials, usually in small amount (1 to 5 per cent by weight or less), also may be present. Such materials include arsenic, antimony, fluorine, lithium, barium, zinc, titanium, $B_2O_3$, iron, cobalt, nickel, lead, phosphate, and the like.

As previously stated, the invention has been found to be especially valuable when used in the coating of window and plate glass which are made of lime soda glass. Such glass usually has the following composition:

Per cent by weight

| | |
|---|---|
| Alkali metal oxide, such as $Na_2O$ and/or $K_2O$ | 10 to 18 |
| Alkaline earth metal oxide, such as CaO and/or MgO | 5 to 16—the CaO content being at least 5 per cent by weight |
| $SiO_2$ | 65 to 75 |
| $Al_2O_3$ | 0 to 20 |

A typical lime soda glass, used as window glass, has the following composition:

| | |
|---|---|
| $SiO_2$ | 71.38 per cent by weight (usual variation 71 to 73 per cent by weight) |
| $Na_2O$ | 12.79 per cent by weight (usual variation 12 to 14 per cent by weight) |
| CaO | 9.67 per cent by weight (usual variation 8 to 11 per cent by weight) |
| MgO | 4.33 per cent by weight |
| $Na_2SO_4$ | 0.75 per cent by weight |
| NaCl | 0.12 per cent by weight |
| $Fe_2O_3$ | 0.15 per cent by weight |
| $Al_2O_3$ | 0.81 per cent by weight |

The Hall factor of products prepared using methanol or similar agent is about 0.01 to 0.04 cubic centimeters per ampere second (as determined by the method described in "Galvanomagnetic and Thermomagnetic Effects" by L. L. Campbell, published 1923 by Longmans & Green, pages 8 to 26, inclusive) whereas, when no methanol or similar agent was used, the Hall constant was 0.09.

Other pertinent properties of these electroconductive films on lime soda glass are:

| | |
|---|---|
| Mobility cm.$^2$/volt second | 8 |
| No. ionized impurity centers per cm.$^3$ | about $10^{20}$ |
| Mean free path of current carriers | about $6 \times 10^{-6}$ cm. |
| Index of refraction of film | about 2 |
| Haze factor | below 2.5% |
| Resistivity | below 0.005 ohm centimeter |

Because of the low specific resistivity of these films, plate or window glass provided with such conductive films of high transparency have a resistance per unit square below 500, and generally less than 150 ohms per unit square.

The haze factor is measured by a method designated "A Tentative Method of Industry for Transparent Plastics by Photoelectric Cell," described in the publication "A. S. T. M. Standards," 1944, part 3, pages 1653–5, American Society Testing Materials, New York.

The color characteristics of the coating are determined to a substantial degree by the thickness of the coating. Colorless coatings may be obtained by use of tin oxide or similar coatings which are below about 75 to 100 millimicrons in thickness. Thicker coatings having a thickness of 75 to 600 microns possess a color depending upon the exact thickness. The exact thickness of the film depends upon the number of coatings and/or the length of time of spraying. In general, the film thickness will not be in excess of 800 microns.

It will be understood that the article which is produced as described above comprises a soda lime glass base, a transparent electroconductive coating on the base, and an intermediate silica layer, film, or coating which has been deposited upon (as distinguished from being formed in situ) and is disposed between the base and the electroconductive coating.

The available $Na_2O$ and equivalent alkali metal oxide content of the film should not exceed that of ordinary untreated soda lime glass after heating the untreated glass at an elevated temperature for a suitable period comparable to the temperature and time of heating used in application of the electroconductive coating, for example, 1150° F. for 4 minutes. Obviously, the film may even be free of alkali metal. However, it should be noted that improvement may be observed through use of films which contain more $Na_2O$ or equivalent alkali metal than ordinary unheated soda lime glass, so long as the alkali metal oxide content is below that of glass which has been heated, after formation into sheets, to the temperature at which the electroconductive coating is applied. Thus, it has been found that when plate glass samples, 6 inches by 6 inches by ⅛ inch, were immersed in 350 cubic centimeters of water for 2 hours, the amount of $Na_2O$ which is dissolved in the solution, determined as sodium magnesium uranyl acetate, amounts to about 0.05 to 0.4 milligram per square foot of glass surface. On the other hand, when such plates are heated for 4 minutes at 1150° F. and immersed in 350 cubic centimeters of water as above, the $Na_2O$ content of the water amounts to from about 1.5 to as high as 3 (the average being about 2) milligrams per square foot of glass surface.

From the above test, it will be apparent that films which exhibit $Na_2O$ contents, according to this test, below 1.5 milligrams per square foot should be used. Even films which contain $Na_2O$, such as those formed from aqueous sodium silicate of the composition $Na_2O \cdot (SiO_2)x$, where X is greater than 3, will effect an improvement in some cases.

The above test affords a convenient method of comparing the available $Na_2O$ content of glass, with glass provided with the film herein contemplated. Samples of uncoated glass and coated glass may be heated in a furnace at the temperature and for the time to be used in the application of the electroconductive coating, for example, 1150° F. and 4 minutes' heating time. These samples then may be cooled and their surface $Na_2O$ content compared as described above. If the $Na_2O$ content of the coated glass sample is found to be lower than that of the untreated glass sample after such heating, the treated glass will, in general, afford improvement as to haze.

In general, appreciable improvement is obtained when the glass to be coated with the electroconductive film exhibits available surface Na₂O, determined as described above, less than about 1 milligram and preferably less than 0.5 milligram per square foot of glass surface. The intermediate films produced according to methods herein described usually exhibit available Na₂O contents of 0.05 to 0.4 milligram per square foot, even after the glass provided with the film has been heated at 1150° F. for 4 minutes.

These intermediate films or coatings may be separately defined layers, or they may be essentially a continuation of the silica skeleton. Thus, the term "film" as applied to these intermediate films, refers to films which are deposited upon the base and those formed in situ.

As noted above, when sheets are treated, it is preferred to apply the silica or similar film to both sides of the sheet to prevent warping during the subsequent application of the electroconductive film. The electroconductive film normally is deposited upon but a single side of the treated surface, although it may be applied upon both sides if desired.

The following examples are illustrative:

Example I

A solution is prepared by mixing 100 parts by volume of carbon tetrachloride with 5 parts by volume of acetone, and then adding one part by volume of anhydrous silicon tetrachloride and filtering the solution. Lime soda glass sheets are dipped in this solution, drained, and allowed to dry in the atmopsphere. During this dipping process, the humidity of the surrounding atmosphere is maintained above about 38 per cent, and the temperature at about 75° F. After drying, the sheets are rubbed with a soft non-abrasive cloth to remove the white bloom upon the plates.

The glass treated as described above has a thin layer of silica on each side thereof. The available Na₂O content of such films, determined as above, usually ranges below 0.1 to 0.2 milligram per square foot. When the glass is heated at 1150° F. for 4 minutes, the available Na₂O rises but slightly, rarely being above 0.4 milligram per square foot. The glass sheet thus coated is vertically suspended, narrow sides being in a horizontal plane, and is heated in a furnace chamber at a temperature if 1150° F. for 3 minutes. A conventional spray gun is filled with a solution prepared by mixing the following components in the proportions:

| | |
|---|---|
| Stannic chloride pentahydrate_____grams__ | 900 |
| Methanol _____milliliters__ | 63 |
| Phenyl hydrazine_____grams__ | 21 |
| Dioctyl sodium sulfosuccinate solution milliliters__ | 30 |

This solution is composed of:

| | |
|---|---|
| Dioctyl sodium sulfosuccinate grams__ | 10 |
| Methanol _____do____ | 45 |
| Water _____do____ | 45 |

Immediately after the heating period, the glass sheet is held vertically with its front face perpendicular to the spray gun, and is moved across the spray so that the guns are directed at a point midway between the top and bottom edges of the sheet.

The rate of moving the sheet across the spray is such as to require approximately 6 seconds to remove the sheet entirely through the spray. During this period, approximately 20 cc. of solution is sprayed from each gun. Following the spraying operation, the sheet is tempered to a temper of approximately one-fourth that of full temper.

The resulting sheet has a clear transparent iridescent tin oxide coating which has a resistivity of approximately 125 ohms per unit square. The thickness of the coating was approximately 350–400 millimicrons.

Example II

A mixture of 1800 grams of ethyl silicate, 1800 grams of ethyl alcohol, 180 grams of water, and 18 grams of 17 per cent (by weight) aqueous HCl solution, is heated at reflux temperature under a reflux condenser for one hour.

Glass sheets are dipped in the resulting solution, drained, and allowed to dry as in Example I. These sheets are heated to 1160° F. and coated according to the process of Example I.

Example III

An aqueous solution is prepared by dissolving 4 grams of stannous acetate and 30 milliliters of methanol in enough 12-Normal aqueous hydrochloric acid to cause the stannous acetate to dissolve. This solution is allowed to age by standing overnight.

A glass plate, 8 inches by 4 inches by 7/64 inch, is coated with a silica film, as in Example I, and is heated in a furnace chamber having a temperature of 1250° F. for 2¼ minutes. Five milliliters of the aged solution is sprayed in 5 seconds from a conventional atomizing spray gun on the heated glass immediately after its removal from the furnace. The resultant product is removed and buffed to remove the surface powder. This coated glass sheet is clear and free from haze. It has conductivity of about 650 to 700 ohms per unit square.

The above described process is capable of several modifications. Thus, the following solutions may be used in lieu of the above described tin chloride or acetate solution:

1. 20 grams zinc acetate $Zn(C_2H_3O_2)_2 \cdot 2H_2O$
   50 grams water
   5 grams phenyl hydrazine hydrochloride 2. 75 grams cadmium acetate
   100 grams water The above described products are capable of use wherever transparency and electroconducting are desirable properties. They are especially effective as windshields or other viewing closures in vehicles, such as automobiles and aircraft, heating elements, instrument dials, etc., which may be constructed as described in the application for United States Letters Patent of William O. Lytle, Serial No. 762,659, filed July 22, 1947.

Although the present invention has been described with reference to the specific details of certain embodiments thereof, it is not intended that such details shall be regarded as limitations upon the scope of the invention except insofar as included in the accompanying claims.

This application is a continuation-in-part of our application Serial No. 36,425, filed July 1, 1948, and now forfeited.

What is claimed:

1. A method of providing a substantially haze-free glass base having a transparent electroconductive coating thereon, which comprises contacting a glass base which has the composition:

| | Per cent by weight |
|---|---|
| Alkali metal oxide of the group consisting of $Na_2O$ and $K_2O$ | 10 to 35 |
| Alkaline earth metal oxide of the group consisting of CaO and MgO | 5 to 25—the CaO content being not less than 5 per cent by weight |
| $SiO_2$ | 50 to 75 |
| $Al_2O_3$ | Up to 20 | with a solution of silicon halide, permitting the glass to dry whereby to form a transparent silica film on said base and a powder deposit on said film comprising an excess of silica, removing the powder deposit, heating said glass to a temperature above about 400° F., but below the temperature at which the glass melts, and contacting the hot glass with stannic chloride whereby to deposit a transparent electroconductive tin oxide coating upon a treated surface of the glass.

2. The method of claim 1 wherein the silicon halide is applied to the glass in the form of a solution of silicon tetrachloride, carbon tetrachloride, and a soluble ketone.

3. A method of providing a substantially haze-free glass base having a transparent electroconductive coating thereon, which comprises contacting a glass base which has the composition:

| | Per cent by weight |
|---|---|
| Alkali metal oxide of the group consisting of $Na_2O$ and $K_2O$ | 10 to 35 |
| Alkaline earth metal oxide of the group consisting of CaO and MgO | 5 to 25—the CaO content being not less than 5 per cent by weight |
| $SiO_2$ | 50 to 75 |
| $Al_2O_3$ | Up to 20 | with a silicon halide, permitting the glass to dry whereby to form a transparent silica film on said base and a powder deposit on said film comprising an excess of silica, removing the powder deposit, heating said glass to a temperature above about 400° F., but below the temperature at which the glass melts, and contacting the hot glass with a decomposable film-forming tin halide whereby to deposit a transparent electroconductive tin oxide coating upon a treated surface of the glass.

4. A method of providing a substantially haze-free glass base having a transparent electroconductive coating thereon, which comprises contacting a glass base which has the composition:

| | Per cent by weight |
|---|---|
| Alkali metal oxide of the group consisting of $Na_2O$ and $K_2O$ | 10 to 35 |
| Alkaline earth metal oxide of the group consisting of CaO and MgO | 5 to 25—the CaO content being not less than 5 per cent by weight |
| $SiO_2$ | 50 to 75 |
| $Al_2O_3$ | Up to 20 | with a silicon halide, permitting the glass to dry whereby to form a transparent silica film on said base and a powder deposit on said film comprising an excess of silica, removing the powder deposit, heating said glass to a temperature above about 400° F., but below the temperature at which the glass melts, and contacting the hot glass with a decomposable film-forming compound of a metal of the group consisting of indium, cadmium, and tin, whereby to deposit a transparent electroconductive coating of an oxide of a metal of said group on a treated surface of the glass.

5. The method of claim 4 wherein the silicon halide is silicon tetrachloride.

6. The method of claim 4 wherein the silicon halide is applied to the glass in the form of a solution of silicon tetrachloride and carbon tetrachloride.

7. The method of claim 4 wherein the silicon halide is applied to the glass in the form of a solution of silicon tetrachloride, carbon tetrachloride, and a soluble ketone.

8. The method of claim 4 wherein the glass has the composition:

| | Per cent by weight |
|---|---|
| Alkali metal oxide of the group consisting of $Na_2O$ and $K_2O$ | 10 to 18 |
| Alkaline earth metal oxide of the group consisting of CaO and MgO | 5 to 16—the CaO content being not less than 5 per cent by weight |
| $SiO_2$ | 65 to 75 |
| $Al_2O_3$ | Up to 5 |

9. The method of claim 8 in which the film-forming compound is stannic chloride.

RICHARD F. RAYMOND.
BROOK J. DENNISON.

REFERENCES CITED

The following references are of record in the file of this patent:

UNITED STATES PATENTS

| Number | Name | Date |
|---|---|---|
| 2,417,147 | Wood | Mar. 11, 1947 |
| 2,429,420 | McMaster | Oct. 21, 1947 |
| 2,442,976 | Heany | June 8, 1948 |